United States Patent
Beckford et al.

(10) Patent No.: US 8,142,165 B2
(45) Date of Patent: Mar. 27, 2012

(54) AEROFOIL

(75) Inventors: Peter R Beckford, Derby (GB); Katherine E Lomas, Derby (GB)

(73) Assignee: Rolls-Royce plc, London (GB)

( * ) Notice: Subject to any disclaimer, the term of this patent is extended or adjusted under 35 U.S.C. 154(b) by 1239 days.

(21) Appl. No.: 11/713,737

(22) Filed: Mar. 5, 2007

(65) Prior Publication Data
US 2007/0231153 A1 Oct. 4, 2007

(30) Foreign Application Priority Data

Mar. 14, 2006 (GB) .................................. 0605070.2

(51) Int. Cl.
*F01D 5/16* (2006.01)
(52) U.S. Cl. ................................ 416/229 A; 416/241 R
(58) Field of Classification Search ............. 416/229 R, 416/229 A, 241 R
See application file for complete search history.

(56) References Cited

U.S. PATENT DOCUMENTS

| | | | | |
|---|---|---|---|---|
| 2,973,170 A | * | 2/1961 | Rodman | 244/123.3 |
| 3,903,578 A | | 9/1975 | Rothman | |
| 4,036,601 A | | 7/1977 | Weimar | |
| 5,127,802 A | * | 7/1992 | Carlson et al. | 416/226 |
| 5,340,530 A | | 8/1994 | Coulon | |
| 5,439,353 A | * | 8/1995 | Cook et al. | 416/230 |
| 5,605,441 A | * | 2/1997 | Boszor et al. | 415/200 |
| 5,634,189 A | | 5/1997 | Rossmann | |
| 5,720,597 A | * | 2/1998 | Wang et al. | 416/229 A |
| 5,782,607 A | | 7/1998 | Smith | |
| 6,004,101 A | | 12/1999 | Schilling | |
| 6,610,419 B1 | * | 8/2003 | Stamm | 428/632 |
| 7,278,830 B2 | * | 10/2007 | Vetters | 416/229 R |
| 2003/0118448 A1 | | 6/2003 | Lee | |
| 2004/0180233 A1 | | 9/2004 | Stamm | |
| 2004/0184921 A1 | * | 9/2004 | Schreiber | 416/229 R |
| 2004/0253115 A1 | * | 12/2004 | Williams et al. | 416/229 R |
| 2005/0035183 A1 | * | 2/2005 | Beckford | 228/193 |
| 2006/0018760 A1 | * | 1/2006 | Bruce et al. | 416/229 A |

FOREIGN PATENT DOCUMENTS

| | | |
|---|---|---|
| EP | 0 496 550 A | 7/1992 |
| EP | 0824981 A1 | 2/1998 |
| EP | 1528118 A2 | 5/2005 |
| GB | 1 193 493 | 6/1970 |
| GB | 2 029 881 A | 3/1980 |
| GB | 2029881 A * | 3/1980 |
| WO | 2005056220 A1 | 6/2005 |

OTHER PUBLICATIONS

European Search Report (dated Oct. 26, 2011) for corresponding European application.

* cited by examiner

*Primary Examiner* — Edward Look
*Assistant Examiner* — Aaron R Eastman
(74) *Attorney, Agent, or Firm* — Jeffrey S. Melcher; Manelli Selter PLLC

(57) ABSTRACT

An aerofoil 31, 43, 56 is provided by layers of material with at least one layer of the material being relatively stiff while other layers of material are less dense but are subject to less stress within the aerofoil. Thus, by judicious positioning of the stiffer layers of material an effective operational aerofoil is achieved, with the other layers of material having a lower stiffness but also lower mass so that the overall mass of the aerofoil is reduced. It will be understood by appropriate positioning of the layers of material it is possible to tune the aerofoil for deformation and vibrational response effects, particularly under impact loading from bird strikes etc.

24 Claims, 2 Drawing Sheets

AEROFOIL

CROSS-REFERENCE TO RELATED APPLICATIONS

This application claims foreign priority to United Kingdom patent application No. GB 0605070.2, filed 14 Mar. 2006.

BACKGROUND OF THE INVENTION

The present application relates to aerofoils and methods of making aerofoils, particularly aerofoils utilised in gas turbine engines for aerospace applications.

Operation of gas turbine engines is well known and incorporates a need for compressor and turbine blades. Fan blades in smaller engines have traditionally been made from solid titanium as the aerofoil size makes it inefficient or impractical to incorporate a honeycomb or line core internal structure as for larger fan blades. It will be understood that fan blades must deliver a required performance, service life and have sufficient bird-strike worthiness at a reasonable weight.

Solid titanium aerofoil surfaces are defined by the aerodynamic form of the blade, which can lead to a structure that has areas of more than sufficient strength to meet its requirements. In such circumstances, utilisation of solid titanium is both expensive and inefficient with respect to weight conservation. Lighter materials are known, which generally incorporate aluminium or magnesium, but are also weaker and therefore would not be considered acceptable in higher stress regions of an aerofoil.

FIG. 1 provides a schematic side view of a prior approach to providing a solid fan blade which is not constructed from solid titanium. Thus, the fan blade 1 retains titanium 2 on the leading edge 2a for bird strike protection, and at the root 2b and at the lower aerofoil 2c in order to carry the rotating weight of the blade 1. In such circumstances, an upper trailing edge 3 is formed from aluminium. Furthermore, magnesium 4 may also be included in the blade 1. The effective reduction in loading also allows substitution of lighter materials such as aluminium, or even lighter materials such as magnesium, further down the aerofoil and so additionally reduces the thickness of the titanium sections for even greater weight savings. It will be understood that joints 5, 6 between the titanium, aluminium and magnesium sections may be scarfed to increase the bonding area and reduce any effect of sudden changes in stiffness.

Solid titanium blades are functionally disadvantaged purely by their own mass. Excess mass on the aerofoil requires extra material on the blade root, the fan disc and other rotating components to ensure sufficient strength for predictable stresses, and additional thickness on the containment case to contain the blade during a blade-off event. Thus, removing mass from the aerofoil would allow much more mass to be removed from other components, leading to a lighter engine and a greater potential payload and other improvements for an aircraft.

Generally, it is not possible to reduce the mass of a solid titanium aerofoil without life reduction as the lower aerofoil carries the parasitic mass of the tip. Smaller blades are more difficult to manufacture with a hollow titanium internal structure, which makes them cost uncompetitive. Additionally, it will be appreciated that simply substituting a proportion of a titanium aerofoil with aluminium would provide weight savings, but these are limited by the differences in properties between aluminium and titanium. Aluminium is less dense and less stiff than the titanium it replaces, altering the vibrational characteristics and the behaviour of the structure during a bird strike. At joints between the differing metals in particular there is a weakness, as the changing stiffness draws load as the aerofoil is deformed during a bird strike.

A change in stiffness and mass may be optimised for vibration and bird strike to obtain full benefits from substituting some of the titanium with lighter metals. This approach is likely to lead to a re-distribution of material over a far greater proportion of the aerofoil than the upper rearward corner, as pictured in FIG. 1.

SUMMARY OF THE INVENTION

In accordance with aspects of the present invention there is provided an aerofoil comprising a plurality of layers of metal having a juxtaposed distribution through the aerofoil depth, at least one layer of relatively stiff metal having a higher stiffness for parts of the aerofoil subject to high levels of stress and/or loading compared to other layers which have a lower stiffness but lighter mass to enable a net reduction in aerofoil mass compared to an aerofoil made from principally the stiff material.

Generally, the relatively stiff material is titanium.

Typically, the other layers of material are formed from aluminium and/or magnesium or titanium alloys.

Possibly, the layers are substantially planar. Additionally, the planar layers may be twisted to form an aerofoil preformed cross-section.

Alternatively, the layers are concentric. Additionally, the concentric layers may be asymmetrically deformed in order to provide an aerofoil preform.

Typically, the juxtaposed distribution of the plurality of layers is arranged in order to improve the distribution of stiffness throughout the aerofoil to enhance impact worthiness.

Possibly, the juxtaposed distribution of layers of material may be provided by thin walled cylinders appropriately deformed to initially contain powder fused in order to create the layers of material as required.

Alternatively, the layers of material may be mechanically secured together. Such mechanical securing of the layers together may be through surface texturing. Potentially such surface texturing may be through castellations in the stiffer material entering a layer of less stiff material.

Also in accordance with the present invention there is provided a method of forming an aerofoil comprising forming layers of preformed structure comprising a plurality of layers of material with at least one layer of relatively stiff material, deforming the preform structure to an aerofoil preform shape and forming the aerofoil perform to an aerofoil shape.

Typically, the layered preform structure comprises forming concentric layers of material. Additionally, the concentric layers of material which form the preform structure are formed asymmetrically to form an elongate cross section as the aerofoil preform.

Alternatively, the layered preform is substantially planar. Possibly, the layered preform structure is twisted in order to form the aerofoil preform.

Generally, the aerofoil preform is machined in order to form an aerofoil.

BRIEF DESCRIPTION OF THE DRAWINGS

Embodiments of the present invention will now be described by way of example only and with reference to the accompanying drawings in which.

DETAILED DESCRIPTION OF THE INVENTION

As indicated above, a fan blade as an aerofoil has areas of relatively high steady stress and other areas with relatively low stress present during normal running. By identifying these areas, aspects of the present invention allow formation of a fan blade aerofoil which is more optimised for weight by utilising necessary materials for high stress areas of the blade but lower weight and therefore potentially less stiff material in other areas. It will be understood that retention of existing aerofoil shapes allows ready substitution into a gas turbine engine, but by aspects of the present invention there is a weight reduction through substitution of solid titanium for less dense materials. Aluminium and magnesium are less dense materials and the embodiments described below will be made with reference to these materials, but it will also be understood that other less dense materials can be used provided they can be adequately joined, whether that be through metallurgical, mechanical or through adhesive attachment or by a combination of these methods to the remainder of the fan blade and to other materials for blade construction other than titanium. In short, as indicated the less dense materials will be utilised in areas of lower stress during normal running of a gas turbine engine. The areas of high stress need to have a strong stiff material such as titanium, but in regions of less stress it is possible to use lighter and weaker materials, so providing a weight saving.

Another feature of aspects of the present invention is that by appropriate choice of materials, a fan blade aerofoil can be tuned vibrationally. In such circumstances it is possible to avoid natural frequencies coincident with operational frequencies of the engine which could cause damage. It is also possible to tune the blade by substituting solid titanium for lighter material of a different stiffness, because both mass and stiffness alter the vibrational characteristics of the structure subject to impact loads through a bird strike.

Clearly, the prime objective with respect to any aerofoil is to achieve its aerodynamic requirements. Generally, the cross section is thin at the leading and trailing edges and substantially thicker in the middle. Such a cross section gives rise to a structure that is far stiffer in the middle than at the leading and trailing edges because the stiffness increases with cube of thickness. Thickness distribution can cause difficulty during a bird strike because the less stiff leading edge forms a large cup where the bird impacts. Similarly, the less stiff trailing edge can whiplash and fracture from the shockwave that propagates rearwards from the initial impact on the leading edge because the stiffness drops off rapidly from the much higher mid-section stiffness.

Figure 1:
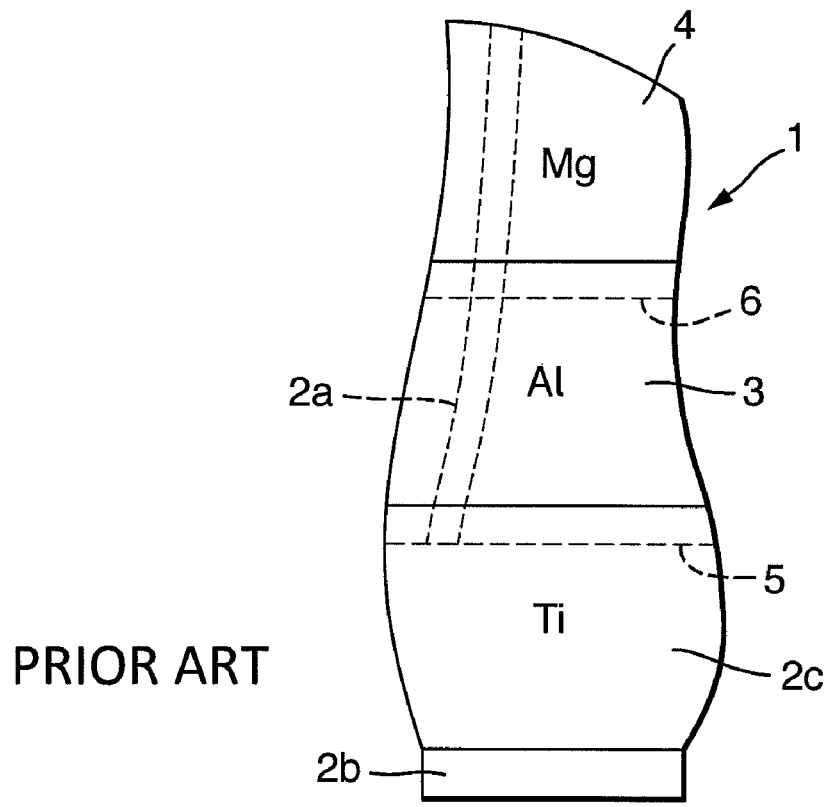
FIG. 1 is a schematic side view of a prior art aerofoil.
Figure 2:
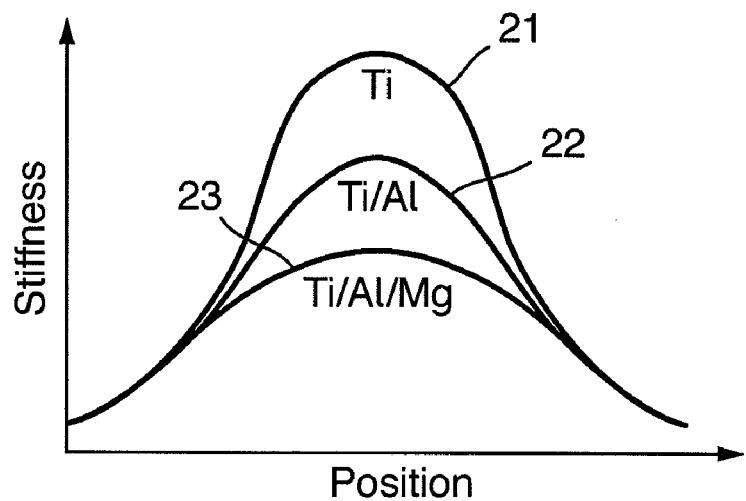
FIG. 2 is a graphic depiction of stiffness against position for an aerofoil formed in accordance with aspects of the present invention.

FIG. 2 shows how stiffness variations across a section can be smoothed by substituting titanium by less stiff materials such as aluminium or magnesium. A solid titanium blade has a stiffness profile 21 that is dictated by aerodynamic requirements, so that if changes are required to give the blade adequate bird strike worthiness, the aerodynamic profile may be compromised. Using lighter materials with different stiffness values allows changes to be made that can improve the bird strike worthiness, yet still maintain the optimum aerodynamic form. Reducing the levels of changes in stiffness helps the blade to bend more uniformly during a bird strike without localising deformations and strains. The entire structure is more able to sway without damage as the bird debris passes over the surface of the blade aerofoil. A titanium and aluminium mix has a profile 22 whilst a titanium, aluminium and magnesium cross-section has a stiffness profile 23. By appropriate choice of profile 21, 22, 23 as indicated, greater acceptability with respect to absorbing bird strike and other impacts through deformation can be achieved.

As indicated above, a fan blade is conventionally defined in terms of thickness over an area of the aerofoil. However, it is mass and stiffness distribution over the aerofoil that determines its vibrational response and behaviour under impacts such as bird strikes. It is possible to define and optimise a stiffness and mass map for a given aerofoil by repeated iteration through the analytical tools used to analyse such structures. This definition is key to realising the maximum weight savings over a solid blade. As indicated above, it is through analysing a blade aerofoil in operation that it is possible to identify areas of necessary stiffness where stiff material such as titanium must be used, whilst lower density and generally less stiff materials can be used in other parts of the blade.

An optimised stiffness and mass map may be used to calculate the required proportions of base material and lighter substitute materials such as aluminium or magnesium through the structure to achieve the desired properties for a blade.

In accordance with aspects of the present invention as will be appreciated, essentially layers of material are utilised in order to create an appropriate aerofoil blade cross section. The cross section may take the form of annular or concentric rings in a cross section reminiscent of wood with different layers of materials either substantially concentric about each other or planar at least during initial stages of manufacture.

Figure 3A:
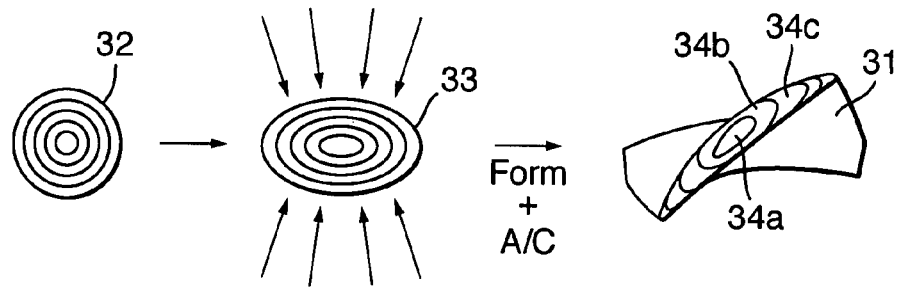
FIG. 3 is a schematic illustration of processing stages with regard to alternate methods of forming an aerofoil in accordance with the present invention.
Figure 3B:
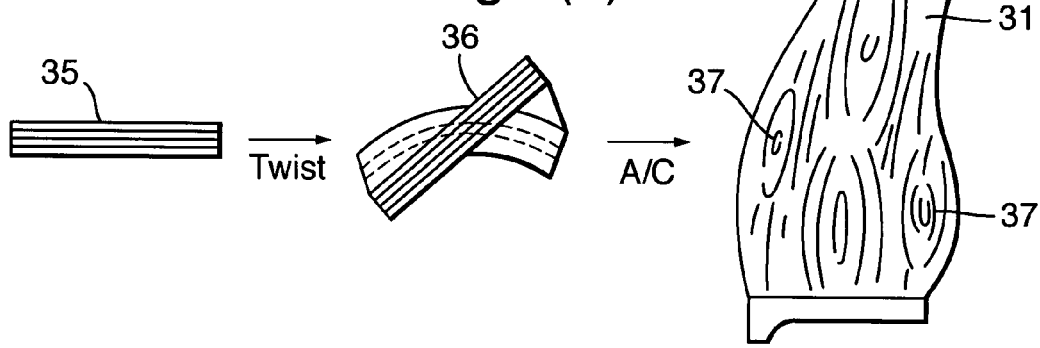

FIG. 3 illustrates two methods of manufacture to achieve a desired final aerofoil cross section 31.

In a first method, a layered preform structure 32 in the form of a bar is created with alternate layers of different materials chosen in order to form an approximate shape as an aerofoil preform 33 through asymmetric deformation. It will be understood that this asymmetric deformation will typically comprise pressing or otherwise. This aerofoil preform 33 is then further shaped and machined by cutting or other processes through outer layers of the preform 33 to leave a final aerofoil shape 31 with the correct proportion of material at the appropriate positions within the blade 31. Thus, as can be seen layers 34a, 34b, 34c etc., are provided in the aerofoil final form 31. These layers 34a, 34b, 34c as indicated above will be formed from materials with different stiffness and weights in order to optimise the stiffness where required within the blade form 31.

A second method of forming the aerofoil 31 involves manufacturing a layered structure 35 again having layers of different materials combined into a slab form. This slab form layered structure 35 is twisted and formed into an appropriate aerofoil preform 36 which is then machined appropriately in order to create an aerofoil final form 31 through machining and other processes to the desired size.

The finished aerofoil 31 may have the appearance of a wood grain effect on its surface where the various layers of material are revealed in patches 37. The steady stress contours on a blade tend to form similar patches on a solid titanium blade and the high stress areas will still be formed from titanium, with the lighter materials replacing the titanium in the lower stressed areas. In such circumstances the aerofoil 31 is optimised to achieve the necessary steady stress in each area of the blade 31 to satisfy component life requirements. Thus, although the necessary stress performance in the appropriate areas of the blade 31 are achieved, this is also provided by a blade of significantly lower mass bringing benefits with regard to engine performance.

Further advantages with regard to altering the stiffness and mass distribution within an aerofoil blade include the ability to alter the amount of untwist and the running shape of the aerofoil. Less chordwise stiffness will increase the degree of untwist as the blade runs up during operation. Allowing the blade to run more closed for greater part speed efficiency than a solid titanium blade will further improve performance. Less mass can have the effect of decreasing the untwist because the centrifugal force on the blade is lessened. It is therefore possible to tune the untwist behaviour of an aerofoil blade to give the optimum untwist between part speed and maximum take off speed of the blade.

It will also be understood that altering the mass and stiffness of a blade in accordance with aspects of the present invention will also influence blade tip clearance. Efficiency can also be improved over a wider blade speed range if blade growth can be better controlled by a reduction in aerofoil mass.

As indicated above, aspects of the present invention comprise an aerofoil blade itself as well as a method of making aerofoil blades. By combining layers of material in different forms (concentric or slab), it is possible through initial asymmetric deformation or twisting actions to create an aerofoil preform which can then be subsequently machined in order to expose the layers of different stiffness material in the final aerofoil form. Each layer may be of a different thickness and a layer may be of variable thickness across its own area. In such circumstances it will be appreciated that choice of the configuration of the layers in the initial layered structure aerofoil preform and final aerofoil form will be important. The layers of material may comprise as indicated above, titanium, less dense but also less stiff materials such as aluminium or magnesium or alloys provided that these layers of material can be appropriately secured together metallurgically, mechanically or through adhesives. Nevertheless, through the concentric or slab nature of the layers, it will be appreciated that some specific, whether that be symmetrical or asymmetrical, altering of the materials can be achieved to appropriately position the layers within the final aerofoil structure as required for necessary stiffness performance.

The present invention generally provides a significant reduction of mass through the substitution of solid titanium with less dense aluminium or magnesium or other appropriate material. The titanium stiffness and therefore weight is utilised in an optimum balance of stiffness, mass and strength within a defined aerodynamic form for aerofoil operation. In such circumstances, a lower weight blade can be achieved which also has improved bird strike and vibrational behaviour without altering the aerodynamics. This significant reduction in mass of the blade will also allow the remainder of the rotor and containment case to be reduced in mass.

Figure 4:
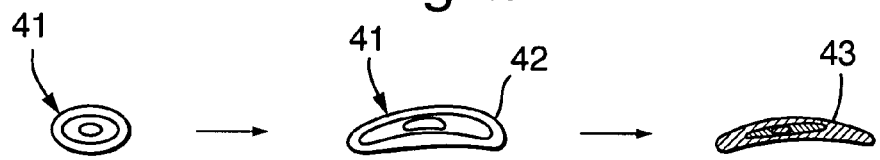
FIG. 4 is a schematic illustration of processing stages with regard to an alternative method of forming an aerofoil in accordance with the present invention.

Further alternative aerofoils and methods of manufacturing aerofoils may include forming the aerofoil from a powder metallurgical process. FIG. 4 illustrates such a process. In such circumstances, thin walled cylinders 41 will be filled with powder materials and formed into an appropriate aerofoil blade shape before being heated and compressed to fuse the powder into a solid. A foaming agent may be incorporated into the powder to cause a proportion of the material to become porous, further reducing its density and stiffness. By this method an aerofoil blade may be formed from titanium with areas that could have incorporated aluminium or magnesium, but instead have been replaced by a foam form of titanium which will have a reduced density but also stiffness.

The method depicted in FIG. 4 as indicated initially has thin walled cylinders 41 which are filled with powder material. The cylinders 41 are then deformed appropriately into an aerofoil preform 42 with the powder still retained within the respective cylinders 41. This aerofoil preform is then further formed through heating or other fusion process such that the powder within the metal cylinders 41 is fused into a solid form with a final aerofoil shape 43.

As indicated above, the powder within the cylinders 41 may comprise an appropriate powder form including titanium or aluminium or magnesium in appropriate proportions. Furthermore, a foaming agent which will render the fused material porous will again reduce mass within the layer formed by the fusion process at the expense of stiffness.

Figure 5:
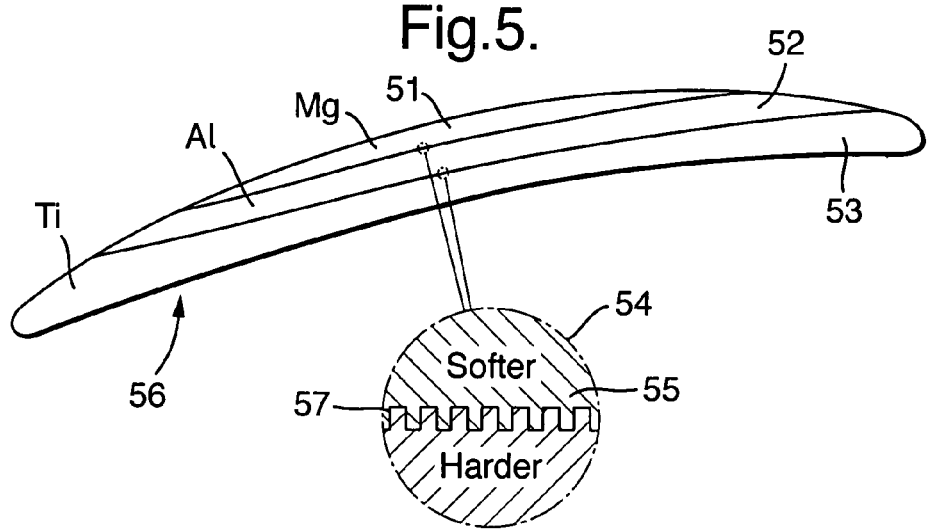
FIG. 5 is a illustration of a further alternative method of forming an aerofoil in accordance with the present invention.

FIG. 5 provides a further alternative method of forming an aerofoil in accordance with the present invention. Thus, again layers of material 51, 52, 53 are combined. In the method depicted in FIG. 5 the layers 51, 52, 53 are mechanically joined through an appropriate surface structure highlighted in an extract 54. Generally, the lighter material 55 will be located on the suction side of an aerofoil blade 56 away from areas of erosion and impaction. The layers 51, 52 will be built up so that if the harder material is textured through castellations 57, the softer material 55 is forced into contact and keys into the castellations 57 of the textured inter-surface. In such circumstances, the layers 51, 52, 53 are appropriately mechanically secured together to optimise stiffness for mass. Typically, the aerofoil 56 will have relatively stiff titanium in layer 53 with a layer of aluminium 52 sandwiched between that layer 53 and a suction side layer of magnesium 51.

As indicated above, aspects of the present invention are particularly applicable to aerofoils which, in view of their relatively small size, have previously been formed from solid material. It will be understood where blade size allows internal structures, passageways and cavities to be formed within a blade, that these passageways and cavities will themselves reduce blade weight such that use of titanium and titanium alloys will therefore be more acceptable in terms of their mass to stiffness ratio. Thus, the present invention has particular applicability where aerofoils with minimal mass are desirable, but which are generally solid. Furthermore, aspects of the present invention have particular advantages where there is a requirement for a desired mass to stiffness distribution for vibration and impact. Such aerofoils, in addition to being blades, may also form vanes, struts and other structures with aerodynamic, structural and vibrational requirements which must be optimised simultaneously.

It will be appreciated that the number of layers of materials provided in aspects of methods as well as aerofoil shapes formed in accordance with aspects of the present invention will depend upon operational requirements. It will be understood that the relative thickness as well as proportioning of the layers and the actual material types utilised will depend upon individual requirements in terms of aerofoil shape, cross section and rotational performance criteria.

Modifications and alterations to the present invention will be appreciated by those skilled in the art. Thus, alternatives to the method described above in order to create the layers and portioning of those layers in order to provide the relatively dense but stiffer materials in parts of the aerofoil when such stiffness is required relative to other areas of lesser stiffness will depend upon operational use of the blade or aerofoil. Clearly, it will be appreciated that some of the methods may be combined in order to provide an aerofoil and costs as well as convenience of manufacture will be factors with respect to suitability of those materials to be combined with each other mechanically, metallurgically or through adhesives.

We claim:

1. An aerofoil comprising:
a plurality of layers having a shape of a solid metal aerofoil, the aerofoil comprising a compressor blade or a turbine blade, the plurality of layers having a juxtaposed distribution through the aerofoil depth, the plurality of layers comprising at least one first layer comprising a first metal having a first stiffness and a first mass, and a second layer comprising a second metal having a second stiffness and a second mass, the first stiffness being greater than the second stiffness, the first mass being greater than the second mass, the first layer being disposed in high stress portions of the aerofoil and the second layer being disposed in low stress portions of the aerofoil, the high stress portions of the aerofoil being subject to higher levels of stress and/or loading during use compared to the low stress portions of the aerofoil, to enable a net reduction in aerofoil mass compared to an aerofoil made from principally the first metal, and wherein the first and second layers are disposed throughout the aerofoil so that the aerofoil has been vibrationally tuned to avoid a natural frequency coincident with an operational frequency.

2. An aerofoil according to claim 1 wherein the first metal is titanium.

3. An aerofoil according to claim 1 wherein the second metal is selected from the group consisting of aluminium, magnesium, and titanium alloys.

4. An aerofoil according to claim 1 wherein the layers are substantially planar.

5. An aerofoil according to claim 4 wherein the planar layers are twisted to form an aerofoil preformed cross section.

6. An aerofoil according to claim 1 wherein the layers are concentric or annular about each other.

7. An aerofoil according to claim 6 wherein the concentric layers are asymmetrically deformed in order to provide an aerofoil preform.

8. An aerofoil according to claim 1 wherein the juxtaposed distribution of layers of metal are provided by thin walled cylinders appropriately deformed to initially contain powder fused in order to create the layers of metal as required.

9. An aerofoil according to claim 1 wherein the layers of metal are mechanically secured together.

10. An aerofoil according to claim 9 wherein mechanical securing of the layers together is through surface texturing.

11. An aerofoil according to claim 10 wherein such surface texturing is through castellations in the first metal entering the second layer of second metal.

12. An aerofoil according to claim 1 wherein the juxtaposed distribution of the plurality of layers is arranged in order to improve the distribution of stiffness throughout the aerofoil to enhance impact worthiness.

13. An aerofoil according to claim 1 wherein the layers of metal are arranged to provide a desired vibration response and/or impact load distribution.

14. An aerofoil comprising:
a plurality of layers having a shape of a solid metal aerofoil, the aerofoil comprising a compressor blade or a turbine blade, the plurality of layers having a juxtaposed distribution through the aerofoil depth, the plurality of layers comprising at least one first layer comprising a first metal having a first stiffness and a first mass, and a second layer comprising a second metal having a second stiffness and a second mass, the first stiffness being greater than the second stiffness, the first mass being greater than the second mass, the first layer being disposed in high stress portions of the aerofoil and the second layer being disposed in low stress portions of the aerofoil, the high stress portions of the aerofoil being subject to higher levels of stress and/or loading during use compared to the low stress portions of the aerofoil, to enable a net reduction in aerofoil mass compared to an aerofoil made from principally the first metal, and wherein an edge of the first layer and an edge of the second layer are visible on a surface of the aerofoil.

15. An aerofoil according to claim 14 wherein the first metal is titanium.

16. An aerofoil according to claim 14 wherein the second metal is selected from the group consisting of aluminium, magnesium, and titanium alloys.

17. An aerofoil according to claim 14 wherein the layers are substantially planar.

18. An aerofoil according to claim 17 wherein the planar layers are twisted to form an aerofoil preformed cross section.

19. An aerofoil according to claim 14 wherein the juxtaposed distribution of layers of metal are provided by thin walled cylinders appropriately deformed to initially contain powder fused in order to create the layers of metal as required.

20. An aerofoil according to claim 14 wherein the layers of metal are mechanically secured together.

21. An aerofoil according to claim 14 wherein mechanical securing of the layers together is through surface texturing.

22. An aerofoil according to claim 21 wherein such surface texturing is through castellations in the first metal entering the second layer of second metal.

23. An aerofoil according to claim 14 wherein the juxtaposed distribution of the plurality of layers is arranged in order to improve the distribution of stiffness throughout the aerofoil to enhance impact worthiness.

24. An aerofoil according to claim 14 wherein the layers of metal are arranged to provide a desired vibration response and/or impact load distribution.

* * * * *